(12) United States Patent
LaPlant et al.

(10) Patent No.: US 8,091,508 B2
(45) Date of Patent: Jan. 10, 2012

(54) POROUS ARTICLE FOR TRAINING ANIMALS FOR URINATION AND DEFECATION

(76) Inventors: William J. LaPlant, Buffalo, MN (US); Michael J. LaPlant, Buffalo, MN (US)

( * ) Notice: Subject to any disclaimer, the term of this patent is extended or adjusted under 35 U.S.C. 154(b) by 512 days.

(21) Appl. No.: 12/107,912

(22) Filed: Apr. 23, 2008

(65) Prior Publication Data

US 2009/0266307 A1    Oct. 29, 2009

(51) Int. Cl.
*A01K 1/01* (2006.01)
(52) U.S. Cl. ........................................ 119/173; 119/161
(58) Field of Classification Search .................. 119/173, 119/161, 163, 165, 169, 171, 172
See application file for complete search history.

(56) References Cited

U.S. PATENT DOCUMENTS

| | | | | |
|---|---|---|---|---|
| 4,800,677 A | * | 1/1989 | Mack | 119/171 |
| 5,415,131 A | * | 5/1995 | Dodman | 119/171 |
| 6,059,247 A | * | 5/2000 | Olivadoti | 248/346.04 |
| 6,227,145 B1 | * | 5/2001 | Miyamoto et al. | 119/172 |
| 6,244,216 B1 | * | 6/2001 | Ochi | 119/171 |
| 6,460,484 B2 | * | 10/2002 | Ikegami et al. | 119/169 |
| 6,553,938 B2 | * | 4/2003 | Ikegami et al. | 119/161 |
| 6,976,451 B2 | * | 12/2005 | Helfman | 119/169 |
| 7,249,570 B1 | * | 7/2007 | Roberson | 119/169 |
| 7,654,227 B1 | * | 2/2010 | Yananton | 119/169 |
| 7,726,260 B1 | * | 6/2010 | Yananton | 119/171 |
| 2002/0112669 A1 | * | 8/2002 | Holt, Jr. | 119/161 |
| 2003/0035929 A1 | * | 2/2003 | Weder | 428/194 |
| 2007/0017453 A1 | * | 1/2007 | Fritter et al. | 119/173 |
| 2007/0169707 A1 | * | 7/2007 | van Zuilekom | 119/169 |
| 2008/0178817 A1 | * | 7/2008 | Brewer | 119/163 |
| 2008/0223301 A1 | * | 9/2008 | Nagao | 119/161 |
| 2008/0236504 A1 | * | 10/2008 | Silverman | 119/169 |
| 2009/0084322 A1 | * | 4/2009 | Axelrod | 119/171 |
| 2009/0151646 A1 | * | 6/2009 | Crawford | 119/169 |
| 2009/0241850 A1 | * | 10/2009 | Campbell et al. | 119/164 |

* cited by examiner

*Primary Examiner* — Yvonne R. Abbott
(74) *Attorney, Agent, or Firm* — Aidenbaum Schloff and Bloom PLLC; Jay Schloff

(57) ABSTRACT

A porous article for attracting animals to excrete urinal and fecal wastes thereof at a predetermined location includes a scent producing agent that is capable of generating a fragrance to attract the animals to the porous article. Further, the porous article includes an absorbent material that is capable of retaining the scent producing agent. A method for training the animals to excrete urinal and fecal wastes thereof at the predetermined location comprises using the porous article.

16 Claims, 1 Drawing Sheet

POROUS ARTICLE FOR TRAINING ANIMALS FOR URINATION AND DEFECATION

FIELD OF THE INVENTION

The present invention relates to a porous article for training an animal to urinate and defecate at a predetermined location. More specifically, the present invention relates to a porous article for attracting an animal, such as a dog, to a predetermined location to excrete urinal and fecal wastes thereon.

BACKGROUND OF THE INVENTION

With an increase in the number of animal lovers, the problem associated with littering caused by urination and defecation of animals has correspondingly increased. Owners of animals, especially dogs, are generally aware of such littering problems. Whenever dogs need to urinate and defecate, they naturally select a specific spot for excreting urinal and fecal wastes thereon. Moreover, the dogs may select a regular spot every time as an elimination site for urinating and defecating. Such regular elimination at any location may cause unsightly "brown spots," thereby reducing the aesthetic appeal of the location.

Most often than not, a location for urination and defecation of the animals, especially dogs, includes a location in an open area such as a lawn, a roadside rest area, a park, a walking path and the like. Consequently, the dog owners face problems of cleaning the location whenever their dogs urinate or defecate. The problems become more pronounced when the dogs urinate and defecate in an area that is within the owners' yards or inside the owners' houses.

Various materials and compositions have previously been disclosed for use in influencing animals to eliminate their wastes at specific locations without littering the environment. Exemplary conventional articles that are used for training animals include absorbent articles or pads for the purposes of urination and defecation. Other exemplary conventional articles include organic compounds or pheromones that serve as olfactory cue to the animals for urination and defecation. However, the conventional articles are incapable of concentrating the urinal and the fecal wastes at a particular location chosen by an owner of the animal. Further, such conventional articles do not carry an aesthetic appeal for use inside an owner's house or in an owner's yard.

Accordingly, there is a need to develop an article that enables an animal, such as a dog, to excrete urinal and fecal wastes at a predetermined location as selected by owner of the animal. Further, the article should be capable of concentrating the urinal and fecal wastes at the predetermined location, thereby eliminating any likelihood of littering caused by the animals over lawns, roadside areas, parks, and such similar locations. Furthermore, there is a need for a method for training the animal to excrete the urinal and fecal wastes at a predetermined location.

SUMMARY OF THE INVENTION

In view of the foregoing disadvantages inherent in the prior art, the general purpose of the present invention is to provide a porous article for attracting an animal to excrete urinal and fecal wastes at a predetermined location, which includes all the advantages of the prior art, and overcomes the drawbacks inherent therein.

Accordingly, an object of the present invention is to provide a means for making an animal excrete urinal and fecal wastes thereof at a predetermined location.

Another object of the present invention is to provide an article that is capable of concentrating an animal's urinal and fecal wastes at a predetermined location, thereby eliminating any likelihood of littering caused by the animal over lawns, roadside areas, parks, and such similar locations.

Yet another object of the present invention is to provide a method for training an animal to urinate and defecate at a predetermined location.

In light of the above objects, in one aspect, the present invention discloses a porous article for attracting at least one animal to excrete urinal and fecal wastes at a predetermined location. The porous article includes a scent producing agent that is capable of generating a fragrance. The fragrance is capable of attracting the at least one animal to the porous article that is disposed at the predetermined location. Further, the porous article includes an absorbent material capable of retaining the scent producing agent.

Further, in another aspect, the present invention discloses a method for training at least one animal to excrete urinal and fecal wastes at a predetermined location. The method includes disposing a porous article at the predetermined location. The porous article includes a scent producing agent that is capable of generating a fragrance for attracting the at least one animal to the porous article. The porous article further includes an absorbent material that is capable of retaining the scent producing agent. Further, the method includes positioning the at least one animal at a distance from the porous article for allowing the at least one animal to smell the fragrance of the scent producing agent.

These together with the other aspects of the present invention, along with the various features of novelty that characterized the present invention, are pointed out with particularity in the claims annexed hereto and form a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWING

The advantages and features of the present invention will become better understood with reference to the following detailed description and claims taken in conjunction with the accompanying drawing, and in which:

DETAILED DESCRIPTION OF THE INVENTION

Figure 1:
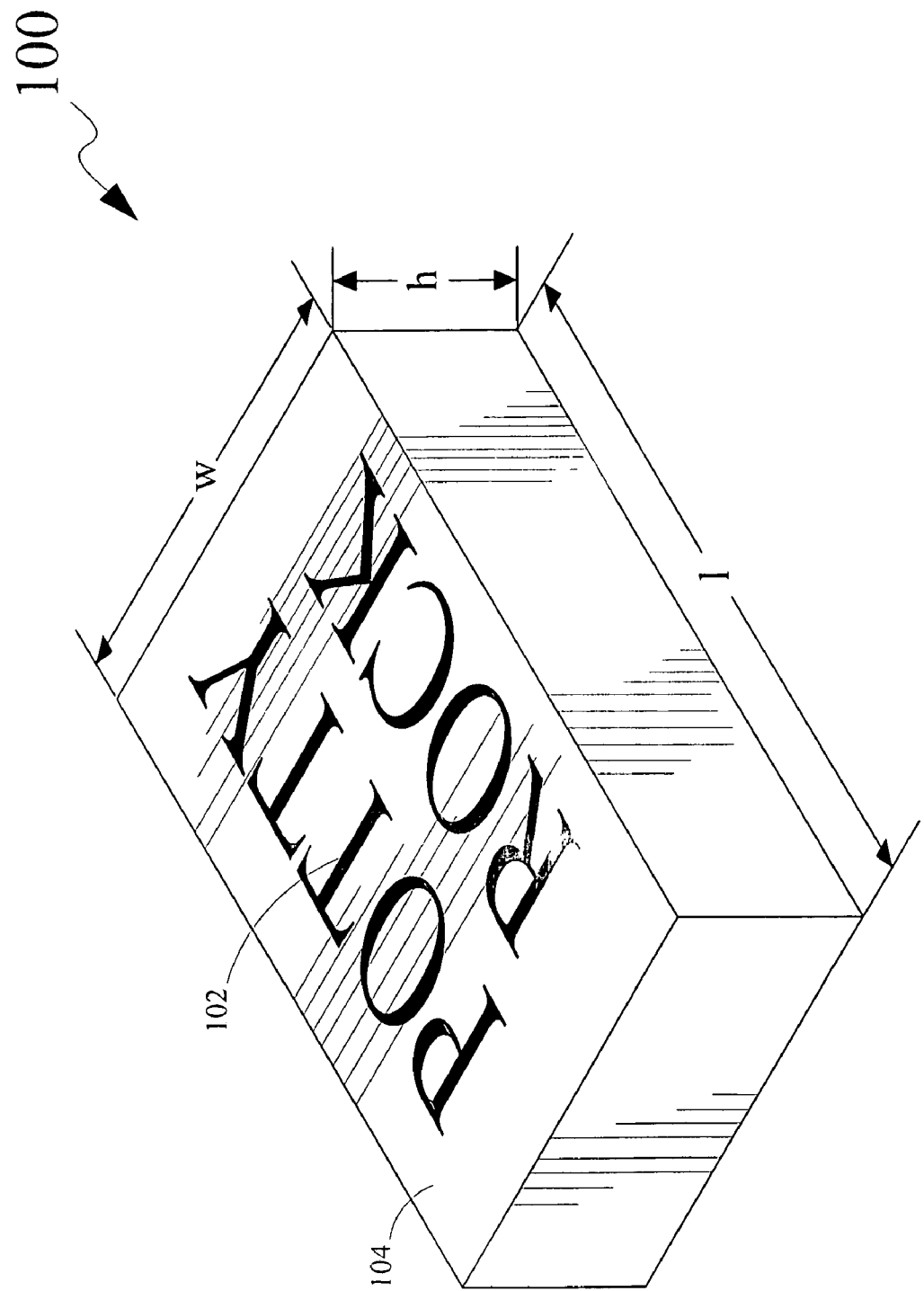
FIG. 1 illustrates a perspective view of a porous article depicting various features thereof, according to an exemplary embodiment of the present invention.

For a thorough understanding of the present invention, reference is to be made to the following detailed description, including the appended claims, in connection with the above-described drawing. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item.

The use of "including," "comprising," or "having" and variations thereof herein is meant to encompass the items listed thereafter and equivalents thereof as well as additional items.

As used herein, the term "elimination activities" refers to urinal and defecation activities performed by an animal, such as a dog.

The present invention provides a porous article for attracting animals to excrete urinal and fecal wastes at a predetermined location. Suitable examples of the animals include pet animals such as dogs and cats. However, for the purpose of this description, the present invention is explained with reference to dogs. Further, the term 'dogs' used herein refers to more than one dog, and accordingly, may interchangeably be referred to as a 'dog'. Moreover, it should be understood that the terms 'dogs' and 'dog' may refer to both male and female dogs.

Accordingly, the present invention provides a porous article that may be employed at a predetermined location selected by a dog owner for the purposes of allowing the dog to excrete urinal and fecal wastes. The porous article includes a scent producing agent that is capable of generating a fragrance to attract the dog to the porous article disposed at the predetermined location. Further, the porous article includes an absorbent material that is capable of retaining the scent producing agent. Various features of the porous article will be better understood by referring to the description of various embodiments of the invention as described below.

The absorbent material, employed in the porous article, is capable of providing a specific structure and shape to the porous article. The term "structure" used herein may be referred to a conformation of the porous article that defines shape, size, and dimensions thereof. Further, the absorbent material imparts porosity to the porous article. The said property of the absorbent material helps in retaining the scent producing agent within the porous article. Therefore, without departing from the scope of the present invention, materials that may be capable of providing the aforementioned properties to the porous article may be used for the purpose of this description.

In one embodiment of the present invention, the absorbent material, used in the porous article, includes a cement-based material. More specifically, the absorbent material is a Portland cement-based material. The cement-based material is responsible for imparting a specific structure and shape to the porous article. Further, the absorbent material includes a porous material. The porous material is responsible for imparting porosity to the porous article, thereby enabling the absorbent material to retain the scent producing agent within the porous article. Suitable examples of the porous article include, but are not limited to, sand, clay, vermiculite, and combinations thereof.

Furthermore, the absorbent material may include a fiber mesh to provide additional strength to the porous article. In addition, the absorbent material may include water to dissolve or mix various components of the absorbent material. More specifically, water may be required for solubilizing and hardening the cement-based material while manufacturing the porous article.

In another embodiment of the present invention, the absorbent material for use in the porous article may either be a wood product, a sponge, or Styrofoam. It should be understood that the absorbent material, as used herein, is a porous material with absorbing characteristics, and therefore, the absorbent material is capable of providing a specific structure and shape to the porous article along with imparting characteristics to retain the scent producing agent within the porous article.

The scent producing agent used in the porous article provides a characteristic fragrance to the porous article. Such a characteristic fragrance attracts a dog to the porous article that is disposed at a predetermined location. The predetermined location may be selected according to the choice of the dog owner. It should be obvious to a person skilled in the art that ascertaining such a scent producing agent involves studying the behavior of dogs towards different scent producing agents, and studying various affects of the scent producing agents on environment and health of the dogs. The scent producing agent, possessing desirable properties to serve the purposes of the present invention, is obtained under the product name, "34491" from Belle-Aire Fragrances, Inc. Further, it should be noted that specific composition of the scent producing agent is a trade secret of Belle-Aire Fragrances, Inc. However, the scent producing agent has been registered with the Environmental Protection Agency in accordance with requirements of the Toxic Substance Control Act, 1976. Moreover, components of the scent producing agent used in the present invention have not been reported under California Proposition 65.

The porous article of the present invention may further include a coloring agent. The coloring agent provides a characteristic color to the porous article. Suitable examples of the coloring agent include, but are not limited to, a brick red coloring agent, a dark grey coloring agent, a light grey coloring agent, a brown coloring agent, a green coloring agent, a blue coloring agent, and combinations thereof. However, it should be understood that other coloring agents may also be used to provide an aesthetic appearance to the porous article. The foregoing attribute may help a dog owner to dispose the porous article at a desirable location in order to resemble a color thereof without affecting an appearance of the location. Such a location may include an area in a lawn, a basement, a deck, a garage, a parking area, and the like. Further, the porous article of the present invention is explained in conjunction with FIG. 1.

FIG. 1 illustrates a perspective view of the porous article, such as a porous article 100, depicting various features thereof, according to an exemplary embodiment of the present invention. As shown in FIG. 1, the porous article 100 is rectangular in shape and is defined by three dimensions, namely length (l), width (w) and height (h). However, it should be understood that the porous article 100 may be prepared in other standard or custom sizes and shapes, as desired. A specific shape and size of the porous article 100 may depend on a specific purpose of use. For example, for the purpose of a household use, such as in lawns, backyards, bathrooms and garages, the porous article 100 may be prepared in the form of a rectangular block that may have a length of about 7 inches, a width of about 5 inches and a height of about ¾ inches. However, for the purpose of a commercial use, such as in kennel yards, parks, beaches and motels, the porous article 100 may be cubical block that may have a length of about 2 feet, a width of about 2 feet and a height of about 1½ feet. Further, the porous article 100 may include a label, such as a label 102. The label 102 represents a trade name engraved on an outer surface 104 of the porous article 100. For the purpose of this description the trade name is depicted by "POTTY ROCK" which is imprinted or fixed on the outer surface 104 during manufacturing of the porous article 100. Without departing from the scope of the present invention, the label 102 may represent applications of the porous article 100. Additionally, the porous article 100 may display or include various designs and figures on the outer surface 104.

The present invention provides a porous article, such as the porous article 100, which may be used as a training device by a dog owner to train his/her dog. Such training will enable the dog to excrete urinal and fecal wastes thereof at a predetermined location as selected by the dog owner.

Accordingly, and in another aspect, the present invention provides a method for training animals, such as dogs, to excrete urinal and fecal wastes at a predetermined location. It should be understood that the predetermined location, as used herein, refers to a location where a dog owner may want the dog to urinate and defecate. Examples of such a location may include, but are not limited to, a specific area of the dog owner's lawn, garage or bathroom, an area of a park, and an area of a city walking path. The method for training includes disposing the porous article of the present invention, such as the porous article 100 of FIG. 1, at a predetermined location. The porous article, as used herein, includes a scent producing agent that is capable of generating a fragrance that attracts the dog to the porous article disposed at the predetermined location. However, it should be understood that the porous article may be disposed at or around the predetermined location. Further the method includes positioning of the dog at a distance from the porous article thereby allowing the dog to smell the fragrance of the porous article. It should be understood that the distance may be defined as a distance at which the dog is capable of smelling the fragrance of the porous article. Such a distance may be close to the porous article. Moreover, it should be understood that for training the dog for enabling it to perform elimination activities at any point of time without any help of the dog owner, the aforementioned method needs to be repeated for about 5 to about 10 times, thereby allowing the dog to identify and distinguish a selected predetermined location for performing the elimination activities.

The porous article of the present invention, such as the porous article 100, may be manufactured using any conventional manufacturing technique that is used for manufacturing a porous rock or a brick. For example, a manufacturing process for fabricating the porous article may include adding a specific quantity of mortar mix, a specific quantity of Portland cement, a specific quantity of the coloring agent, a specific quantity of fiber mesh, a specific quantity of the scent producing agent and a specific volume of water. The quantities of the aforementioned components to be used depend on size, shape and number of porous articles that need to be manufactured at a time. More specifically, about 100 pounds (lbs) of mortar mix, about 4 cups of the Portland cement, about 4 cups of the coloring agent, about ¼ cup of the fiber mesh, about 8 ounces of the scent producing agent and a two gallons of water may be used to manufacture about 100 porous articles. The method further includes blending of the aforementioned components to form a homogenous mixture thereof. Thereafter, the method includes molding of the homogenous mixture in a desired standard or custom shape and size to prepare the porous article of the present invention. Without departing from the scope of the present invention, the porous article may be packaged in a cover such as a wrapping cover. An outer surface of the wrapping cover may represent the contents or applications of the porous article enclosed within.

The present invention provides a porous article that serves as a training device for animals, and more specifically for dogs, to excrete their urinal and fecal wastes at a predetermined location selected by an animal owner. The porous article of the present invention produces a specific fragrance that imitates a smell of an animal's urine or fecal waste. The said property of the porous article allows any animal to identify a spot, at which the porous article is disposed, every time it needs to perform elimination activities. Consequently, the porous article is capable of concentrating any area that has urinal and fecal wastes thereon, thereby preventing any likelihood of littering caused by the animals. More specifically, the aforementioned aspect helps to eliminate any likelihood of littering over lawns, roadside areas, beaches, parks, and such similar locations. Further, the porous article exhibits an aesthetic appearance for use inside the animal owner's house. Furthermore, the porous article is easy to clean. Additionally, the porous article is stable against sunlight, snow and rain, with the fragrance capable of being sensed by an animal for up to over four years after the article is deployed. In fact, an exposure to rain water or snow enhances the efficacy of the scent producing agent thereby providing an increased fragrance from the porous article. Moreover, the porous article is non-toxic to animals or humans and has no adverse effects on the environment.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present invention.

What is claimed is:

1. A porous article for attracting at least one animal to excrete urinal and fecal wastes at a predetermined location, the porous article comprising:
   a scent producing agent, the scent producing agent capable of generating a fragrance to attract the at least one animal to the porous article disposed at the predetermined location; and
   an absorbent material, the absorbent material for retaining the scent producing agent within the porous article and for providing a specific structure and shape to the porous article, the absorbent material comprising a cement-based material and a porous material.

2. The porous article of claim 1, wherein the cement-based material is a Portland cement-based material.

3. The porous article of claim 1, wherein the porous material is selected from the group consisting of sand, clay, vermiculite, and combinations thereof.

4. The porous article of claim 1, wherein the absorbent material further comprises a fiber mesh.

5. The porous article of claim 1, wherein the absorbent material further comprises water.

6. The porous article of claim 1, further comprising a coloring agent.

7. The porous article of claim 6, wherein the coloring agent is selected from the group consisting of a brick red coloring agent, a dark grey coloring agent, a light grey coloring agent, a brown coloring agent, a green coloring agent, a blue coloring agent, and combinations thereof.

8. The porous article of claim 1, wherein the at least one animal is a dog.

9. A method for training at least one animal to excrete urinal and fecal wastes at a predetermined location, the method comprising:
   disposing a porous article at the predetermined location, the porous article comprising,
      a scent producing agent, the scent producing agent capable of producing a fragrance to attract the at least one animal to the porous article for excreting the urinal and fecal wastes at the predetermined location, and
      an absorbent material, the absorbent material for retaining the scent producing agent within the porous article and for providing a specific structure and shape to the porous article, the absorbent material comprising a cement-based material and a porous material; and
   positioning the at least one animal at a distance from the porous article for allowing the at least one animal to smell the fragrance of the scent producing agent.

10. The method of claim 9, wherein the cement-based material is a Portland cement-based material.

11. The method of claim 9, wherein the porous material is selected from the group consisting of sand, clay, vermiculite, and combinations thereof.

12. The method of claim 9, wherein the absorbent material further comprises a fiber mesh.

13. The method of claim 9, wherein the absorbent material further comprises water.

14. The method of claim 9, wherein the porous article further comprises a coloring agent.

15. The method of claim 14, wherein the coloring agent is selected from the group consisting of a brick red coloring agent, a dark grey coloring agent, a light grey coloring agent, a brown coloring agent, a green coloring agent, a blue coloring agent, and combinations thereof.

16. The method of claim 9, wherein the at least one animal is a dog.

* * * * *